(12) United States Patent
Rodrigues et al.

(10) Patent No.: US 7,739,546 B1
(45) Date of Patent: Jun. 15, 2010

(54) SYSTEM AND METHOD FOR STORING AND RETRIEVING FILE SYSTEM LOG INFORMATION IN A CLUSTERED COMPUTER SYSTEM

(75) Inventors: Steven H. Rodrigues, Mountain View, CA (US); Paul Christopher Eastham, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 416 days.

(21) Appl. No.: 11/584,185

(22) Filed: Oct. 20, 2006

(51) Int. Cl.
*G06F 11/00* (2006.01)
(52) U.S. Cl. .................. 714/13; 714/4; 714/5; 714/6
(58) Field of Classification Search ............... 714/4–6, 714/13
See application file for complete search history.

(56) References Cited

U.S. PATENT DOCUMENTS

| | | | |
|---|---|---|---|
| 4,570,217 A | 2/1986 | Allen et al. | |
| 5,124,987 A | 6/1992 | Milligan et al. | |
| 5,163,131 A | 11/1992 | Row et al. | |
| 5,202,979 A | 4/1993 | Hillis et al. | |
| 5,278,979 A | 1/1994 | Foster et al. | |
| 5,403,667 A | 4/1995 | Simoens | |
| 5,581,724 A | 12/1996 | Belsan et al. | |
| 5,819,292 A | 10/1998 | Hitz et al. | |
| 6,061,770 A | 5/2000 | Franklin | |
| 6,081,875 A | 6/2000 | Clifton et al. | |
| 6,341,341 B1 | 1/2002 | Grummon et al. | |
| 6,675,316 B1 * | 1/2004 | Harper | 714/4 |
| 6,728,897 B1 * | 4/2004 | Cramer et al. | 714/6 |
| 6,920,579 B1 * | 7/2005 | Cramer et al. | 714/4 |
| 6,978,398 B2 * | 12/2005 | Harper et al. | 714/13 |
| 7,055,057 B2 * | 5/2006 | Achiwa | 714/6 |
| 7,107,385 B2 | 9/2006 | Rajan et al. | |
| 7,127,577 B2 | 10/2006 | Koning et al. | |
| 7,168,001 B2 * | 1/2007 | Johnson et al. | 714/13 |
| 7,178,050 B2 * | 2/2007 | Fung et al. | 714/4 |
| 7,260,737 B1 * | 8/2007 | Lent et al. | 714/5 |
| 7,409,094 B2 | 8/2008 | Wee et al. | |
| 7,409,494 B2 | 8/2008 | Edwards | |
| 2004/0030668 A1 | 2/2004 | Pawlowski | |
| 2005/0246401 A1 | 11/2005 | Edwards et al. | |
| 2006/0143498 A1 * | 6/2006 | Hatasaki et al. | 714/4 |
| 2009/0031096 A1 * | 1/2009 | Smith et al. | 711/162 |

OTHER PUBLICATIONS

Akyurek, Sedat, *Placing Replicated Data to Reduce Seek Delays*, De-partment of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

(Continued)

*Primary Examiner*—Philip Guyton
(74) *Attorney, Agent, or Firm*—Cesari and McKenna, LLP

(57) ABSTRACT

A system and method for storing and retrieving file system log information in a cluster computer system is provided. In response to an aborted takeover operation, a surviving storage system stores a set of file replay log information on storage devices associated with the surviving storage system. When the failed storage system re-initializes, it retrieves the file replay log information from the surviving storage system and utilizes the file replay log information to render its disks consistent.

22 Claims, 8 Drawing Sheets

OTHER PUBLICATIONS

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage Department of Computer Science*, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms, IEEE Transactions on Software Engineering*, 14(2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104 .

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

\* cited by examiner

SYSTEM AND METHOD FOR STORING AND RETRIEVING FILE SYSTEM LOG INFORMATION IN A CLUSTERED COMPUTER SYSTEM

FIELD OF THE INVENTION

The present invention relates to clustered storage systems and, in particular, to storing and retrieving file system log information in a clustered storage system.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The storage system may be further configured to operate according to a client/server model of information delivery to thereby allow many client systems (clients) to access shared resources, such as files, stored on the storage system. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the storage system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage system that manages data access to a set of disks using one or more block-based protocols, such as SCSI embedded in Fibre Channel (FCP). One example of a SAN arrangement is described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al.

It is advantageous for the services and data provided by a storage system to be available for access to the greatest degree possible. Accordingly, some storage system environments provide a plurality of storage systems in a cluster, with a property that when a first storage system fails, the second storage system ("partner") is available to take over and provide the services and the data otherwise provided by the first storage system. When the first storage system fails, the second partner storage system in the cluster assumes the tasks of processing and handling any data access requests normally processed by the first storage system. One such example of a storage system cluster configuration is described in U.S. patent application Ser. No. 10/421,297, entitled SYSTEM AND METHOD FOR TRANSPORT-LEVEL FAILOVER OF FCP DEVICES IN A CLUSTER, by Arthur F. Lent, et al. An administrator may desire to take a storage system offline for a variety of reasons including, for example, to upgrade hardware, etc. In such situations, it may be advantageous to perform a user-initiated takeover operation, as opposed to a failover operation. After the takeover operation is complete, the storage system's data will be serviced by its partner until a giveback operation is performed.

In a typical storage system cluster configuration, each storage system within the cluster contains a nonvolatile log (NVLog) that is stored in nonvolatile random access memory (NVRAM). Each storage system stores ("logs") received data access operations directed to the storage system in its NVLog. In addition, each storage system forwards received data access operations to its partner storage system for storage in the partner's NVLog. Thus, during a failover operation, the surviving storage system may flush (write) the data associated with operations stored in the NVLog to storage devices, such as disks, associated with the failed storage system to bring those disks to a consistent state before initiating the processing of newly received data access operations, thereby enabling transparent failover operations while providing data consistency guarantees.

One scenario that may cause noted disadvantages in known cluster environments arises when a first storage system suffers an error condition that results in it entering a degraded mode. For example, a disk may fail, thereby resulting in the storage system initiating a RAID parity recomputation to recover the data contained on the failed disk. A subsequent error condition of the first storage system results in a failover operation of its data containers to a second partner storage system, which then suffers an error condition within a relatively short time period. However, the second storage system may have serviced data access requests directed to the data containers, with the appropriate logging of data in its NVLog. The rapid error condition of the second storage system causes that system to perform a giveback operation of the data containers to the first storage system prior to the containers being cleanly "shut down" by the second storage system i.e., before parity recomputation to recover any lost data. As noted, the NVLog data, including parity information, only exists on the second storage system; thus, when the first storage system re-initializes, it marks the data containers as dirty. If all of the storage devices associated with the data containers are present, the first storage system may perform appropriate parity computations to render the data containers as "clean". However, if one or more storage devices are missing and/or inoperative, the first storage system must perform a complete file system check, resulting in considerable downtime and data unavailability, which may be on the order of hours and/or days depending on the size of the file system.

SUMMARY OF THE INVENTION

The present invention overcomes the disadvantages of the prior art by providing a system and method for storing and retrieving file system log information, such as NVLog information, in a clustered computer system. As used herein, a storage system cluster comprises a plurality of storage systems illustratively interconnected by a cluster interconnect device. Each storage system is further coupled to a plurality of storage devices, such as disks. In the event that a first storage system suffers an error condition, its partner storage system, (i.e., a second storage system) initiates a takeover operation of the disks and associated data containers serviced by the storage system.

In response to later suffering an error condition of its own, the second storage system stores file system log information associated with the disks of the first storage system in a file replay log within its root volume. Upon re-initialization of both storage systems, the first storage system may request, via the cluster interconnect, the contents of the file replay log from the second storage system. The second storage system transmits the log information from the file replay log to the first storage system via the cluster interconnect, which then utilizes the file replay log information to ensure that its disks are in a consistent state. The first storage system may then resume data access operations without loss of data and/or significant periods of data unavailability.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Clustered Storage System Environment

As noted, the present invention provides a system and method for storing and retrieving file system log information, such as NVLog information, in a clustered computer system. As used herein, a storage system cluster comprises a plurality of storage systems illustratively interconnected by a cluster interconnect device. Each storage system is further coupled to a plurality of storage devices, such as disks. In the event that a first stores age system suffers an error condition, its partner storage system, (i.e., a second storage system) initiates a takeover operation of the disks and associated data containers serviced by the storage system.

In response to later suffering an error condition of its own, the second storage system stores file system log information associated with the disks of the first storage system in a file replay log within its root volume. Upon re-initialization of both storage systems, the first storage system may request, via the cluster interconnect, the contents of the file replay log from the second storage system. The second storage system transmits the log information from the file replay log to the first storage system via the cluster interconnect, which then utilizes the file replay log information to ensure that its disks are in a consistent state. The first storage system may then resume data access operations without loss of data and/or significant periods of data unavailability.

Figure 1:
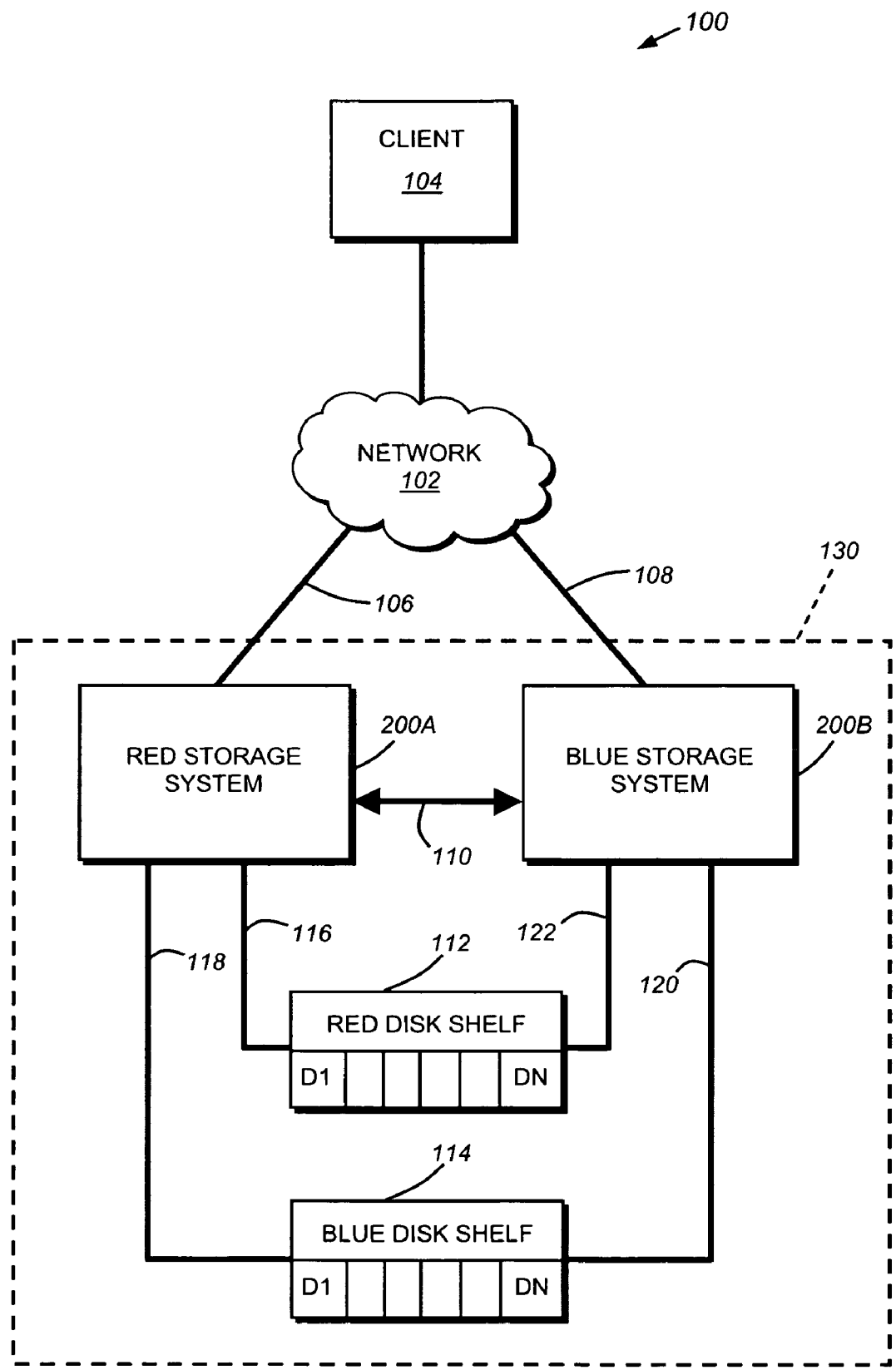
FIG. 1 is a schematic block diagram of a storage system cluster environment in accordance with an embodiment of the present invention.

FIG. 1 is a schematic block diagram of an exemplary network environment 100 in which the principles of the present invention may be implemented. The environment 100 comprises a network 102 coupled to a client 104. The client 104 may be a general-purpose computer, such as a PC or a workstation, or a special-purpose computer, such as an application server, configured to execute applications over an operating system that includes block access protocols. A storage system cluster 130 comprising Red storage system 200A and Blue storage system 200B is also connected to the network 102. These storage systems, described further below, are configured to control storage of and access to interconnected storage devices, such as disks residing on disk shelves 112 and 114.

In the illustrative example, Red storage system 200A is connected to Red disk shelf 112 by a data access loop 116. It should be noted that such a data access loop can be any acceptable networking media including, for example, a Fibre Channel Arbitrated Loop (FC-AL). The red storage system 200A also accesses Blue disk shelf 114 via counterpart data access loop 118. Likewise, Blue storage system 200B accesses Blue disk shelf 114 via data access loop 120 and Red disk shelf 112 through counterpart data access loop 122. Thus each disk shelf in the cluster is accessible to each storage system, thereby providing redundant data paths in the event of a failover. It should be noted that the Red and Blue disk shelves are shown directly connected to the storage systems 200 for illustrative purposes only. The disk shelves and storage systems may be operatively interconnected in any suitable FC switching network topology. Alternately, the disks may be connected to the storage systems using any computer-disk interconnection technique.

During normal cluster operation, the storage system that is connected to a disk shelf via the disk shelf's primary loop is the "owner" of the disk shelf and is primarily responsible for servicing data requests directed to blocks on volumes contained on that disk shelf. Thus, in this example, the Red storage system 200A owns the Red Disk Shelf 112 and is primarily responsible for servicing data access requests for blocks contained on that disk shelf. Similarly, the Blue storage system 200B is primarily responsible for the Blue disk shelf 114. When operating as storage system cluster 130, each storage system 200 is typically configured to take over and assume data handling capabilities for the other disk shelf in the cluster 130.

Connecting the Red and Blue storage systems 200A, B is a cluster interconnect 110, which provides a direct communication link between the two storage systems. The cluster interconnect 110 can be of any suitable communication medium, including, for example, an Ethernet connection or a FC data link.

Communication links 106 and 108 may comprise a plurality of differing connections including, for example, a single network link connection or multiple network "paths" between the network 102 and the storage systems 200. For example, a single network link may be connected to a single physical port on a "local" storage system, which may further utilize a virtual port for servicing data access requests directed to itself and its "partner" storage system. Similarly, the storage system 200 may include a plurality of physical ports, each of which is connected to a separate physical network link 106 or 108. As would be appreciated by one skilled in the art, a plurality of configurations are possible to meet various configuration objectives of the storage system cluster 130.

B. Storage System

Figure 2:
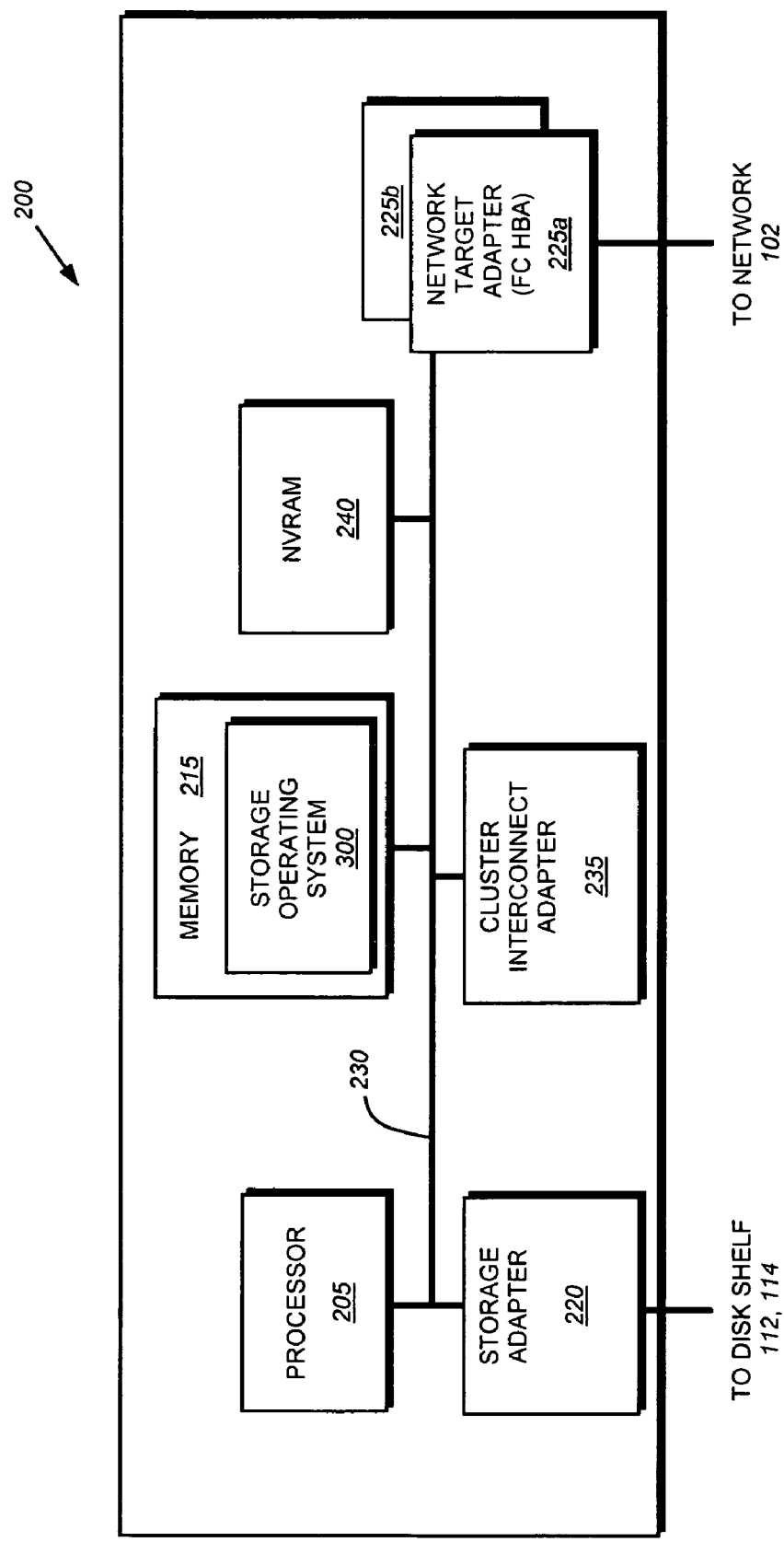
FIG. 2 is a schematic block diagram of an exemplary storage system in accordance with an embodiment of the present invention.

FIG. 2 is a schematic block diagram of an exemplary storage system 200 used in cluster 130 and configured to provide storage service relating to the organization of information on storage devices, such as disks. The storage system 200 illustratively comprises a processor 205, a memory 215, a plurality of network adapters 225a, 225b, a storage adapter 220 and a cluster interconnect adapter 235 interconnected by a system bus 230. A storage system is a computer having features such as simplicity of storage service management and ease of storage reconfiguration, including reusable storage space, for users (system administrators) and clients of network attached storage (NAS) and storage area networks (SAN) deployments. The storage system may provide NAS services through a file system, while the same system provides SAN services through SAN virtualization, including logical unit number (lun) emulation. The storage system 200 also includes a storage operating system 300 that provides a virtualization system to logically organize the information as a hierarchical structure of data containers, such as directory, file and virtual disk (vdisk) storage objects on the disks.

Whereas clients of a NAS-based network environment have a storage viewpoint of files, the clients of a SAN-based network environment have a storage viewpoint of blocks or disks. To that end, the storage system 200 presents (exports) disks to SAN clients through the creation of luns or vdisk objects. A vdisk object (hereinafter "vdisk") is a special file type that is implemented by the virtualization system and translated into an emulated disk as viewed by the SAN clients. Such vdisks objects are further described in U.S. patent application Ser. No. 10/216,453 entitled STORAGE VIRTUALIZATION BY LAYERING VIRTUAL DISK OBJECTS ON A FILE SYSTEM, by Vijayan Rajan, et al. The storage system thereafter makes these emulated disks accessible to the SAN clients through controlled exports, as described further herein.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage system by, inter alia, invoking storage operations in support of the storage service implemented by the storage system. It will be apparent to those skilled in the art that other processing and memory means, including various computer readable media, may be used for storing and executing program instructions pertaining to the inventive system and method described herein.

The network adapters 225a, b couple the storage system to a plurality of clients over point-to-point links, wide area networks (WAN), virtual private networks (VPN) implemented over a public network (Internet) or a shared local area network (LAN) or any other acceptable networking architecture. The network adapters 225 a, b also couple the storage system 200 to a plurality of clients 104 that may be further configured to access the stored information as blocks or disks. The network adapters 225 may comprise a FC host bus adapter (HBA) having the mechanical, electrical and signaling circuitry needed to connect the storage system 200 to the network 102. In addition to providing FC access, the FC HBA may offload FC network processing operations from the storage system's processor 205.

The clients may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage system 200.

The storage system 200 supports various SCSI-based protocols used in SAN deployments, including SCSI encapsulated over TCP (iSCSI) and SCSI encapsulated over FC (FCP). The clients 104 may thus request the services of the storage system 200 by issuing iSCSI and/or FCP messages over the network 102 to access information stored on the disks. It will be apparent to those skilled in the art that the clients may also request the services of the integrated storage system using other block access protocols. By supporting a plurality of block access protocols, the storage system provides a unified and coherent access solution to vdisks/luns in a heterogeneous SAN environment.

The storage adapter 220 cooperates with the storage operating system 300 executing on the storage system to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets or messages and returned to the clients. Non-volatile memory is provided in NVRAM 240, which is also coupled to the bus 230.

Storage of information on the storage system 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with virtualization system code to provide a function that "virtualizes" the storage space provided by the disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as vdisks on the disks, thereby providing an integrated NAS and SAN system approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage system via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

A cluster interconnect adapter 235 of the storage system 200 is coupled to the cluster interconnect 110 to provide a connection to a cluster partner. Illustratively, the cluster interconnect adapter 235 is a FC HBA. The storage system utilizes the cluster interconnect for a variety of purposes including, for example, exchanging status information and heartbeat signals with its cluster partner. In accordance with the illustrative embodiment of the present invention, the cluster interconnect also provides a data pathway for retrieving file system log information from a cluster partner.

In addition, it will be understood to those skilled in the art that the inventive technique described herein may apply to any type of special-purpose or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Storage Operating System

In the illustrative embodiment, the storage operating system is the NetApp® Data ONTAP® operating system that implements a Write Anywhere File Layout (WAFL®) file system. However, it is expressly contemplated that any appropriate storage operating system, including a write in-place file system, may be enhanced for use in accordance with the inventive principles described herein. As such, where the term "Data ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP® storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

Figure 3:
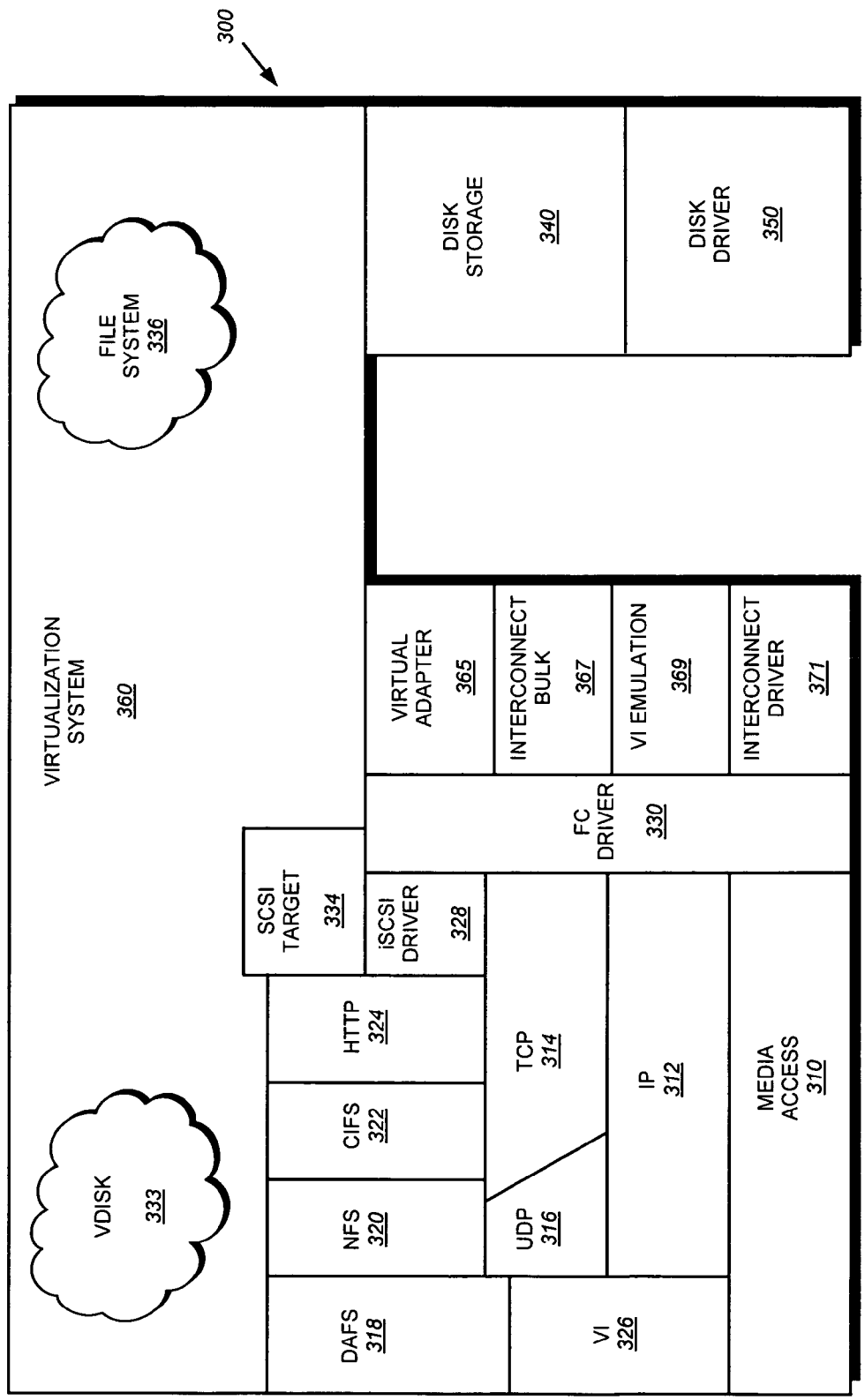
FIG. 3 is a schematic block diagram of an exemplary storage operating system for use with the exemplary storage system of FIG. 2 in accordance with an exemplary embodiment of the present invention.

FIG. 3 is a schematic block diagram of a storage operating system 300 that may be advantageously used with the present invention. The storage operating system comprises a series of software layers organized to form an integrated network protocol stack or multi-protocol engine that provides data paths for clients to access information stored on the multi-protocol storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates with the FC HBA 225 to receive and transmit block access requests and responses to and from the integrated storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage system. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization software embodied as, e.g., vdisk module 333 and SCSI target module 334. These modules may be implemented as software, hardware, firmware or a combination thereof. The vdisk module 333 manages SAN deployments by, among other things, implementing a comprehensive set of vdisk (lun) commands that are converted to primitive file system operations ("primitives") that interact with the file system 336 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization system 360 between the SAN block (lun) space and the file system space, where luns are represented as vdisks.

The file system 336 illustratively implements the Write Anywhere File Layout (WAFL) file system having an on-disk format representation that is block-based using, e.g., 4 kilobyte (KB) blocks and using inodes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

The storage operating system 300 also includes an interconnect communication stack that comprises a virtual adapter 365, an interconnect bulk 367, a VI emulation layer 369 and an interconnect driver layer 371. The virtual adapter 365 provides a software interface between the virtualization system 360 and the lower levels of the interconnect protocol stack, i.e., the virtual adapter 365 functions as an adapter driver to the interconnect protocol stack. The interconnect bulk module 367 provides flow control over the cluster interconnect 110. The VI emulation layer 369 implements the appropriate RDMA functionality of a VI protocol over the interconnect driver 371, which directly interfaces with the cluster interconnect adapter 235 to provide data access transmissions over the cluster interconnect 110.

D. File System Organization

Figure 4:
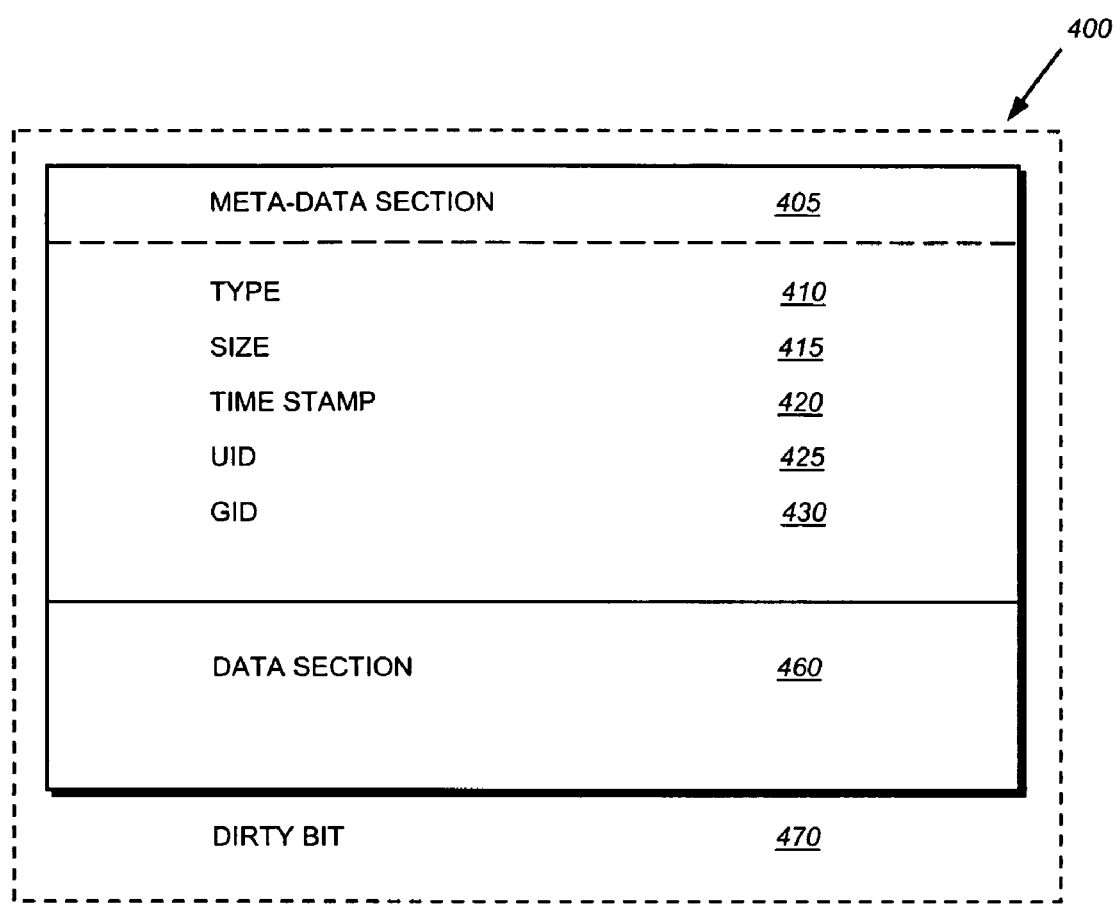
FIG. 4 is a schematic block diagram of an exemplary inode in accordance with an embodiment of the present invention.

In the illustrative embodiment, a data container is represented in the write-anywhere file system as an inode data structure adapted for storage on the disk shelves 112, 114. FIG. 4 is a schematic block diagram of an inode 400, which preferably includes a meta-data section 405 and a data section 460. The information stored in the meta-data section 405 of each inode 400 describes the data container (e.g., a file) and, as such, includes the type (e.g., regular, directory, vdisk) 410 of file, its size 415, time stamps (e.g., access and/or modification time) 420 and ownership, i.e., user identifier (UID 425) and group ID (GID 430), of the file. The contents of the data section 460 of each inode may be interpreted differently depending upon the type of file (inode) defined within the type field 410. For example, the data section 460 of a directory inode contains meta-data controlled by the file system, whereas the data section of a regular inode contains file system data. In this latter case, the data section 460 includes a representation of the data associated with the file.

Specifically, the data section 460 of a regular on-disk inode may include file system data or pointers, the latter referencing 4 KB data blocks on disk used to store the file system data. Each pointer is preferably a logical vbn to facilitate efficiency among the file system and the RAID system 340 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 460 of the inode (e.g., a second level inode) references an indirect block (e.g., a first level L1 block) that contains 1024 pointers, each of which references a 4 KB data block on disk. For file system data having a size greater than 64 MB, each pointer in the data section 460 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 kB data block on disk. When accessing a file, each block of the file may be loaded from disks into the memory 215.

When an on-disk inode (or block) is loaded from disk shelves 112, 114 into memory 215, its corresponding in-core structure embeds the on-disk structure. For example, the dotted line surrounding the inode 400 indicates the in-core representation of the on-disk inode structure. The in-core structure is a block of memory that stores the on-disk structure plus additional information needed to manage data in the memory (but not on disk). The additional information may include, e.g., a "dirty" bit 470. After data in the inode (or block) is updated/modified as instructed by, e.g., a write operation, the modified data is marked "dirty" using the dirty bit 470 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292.

Figure 5:
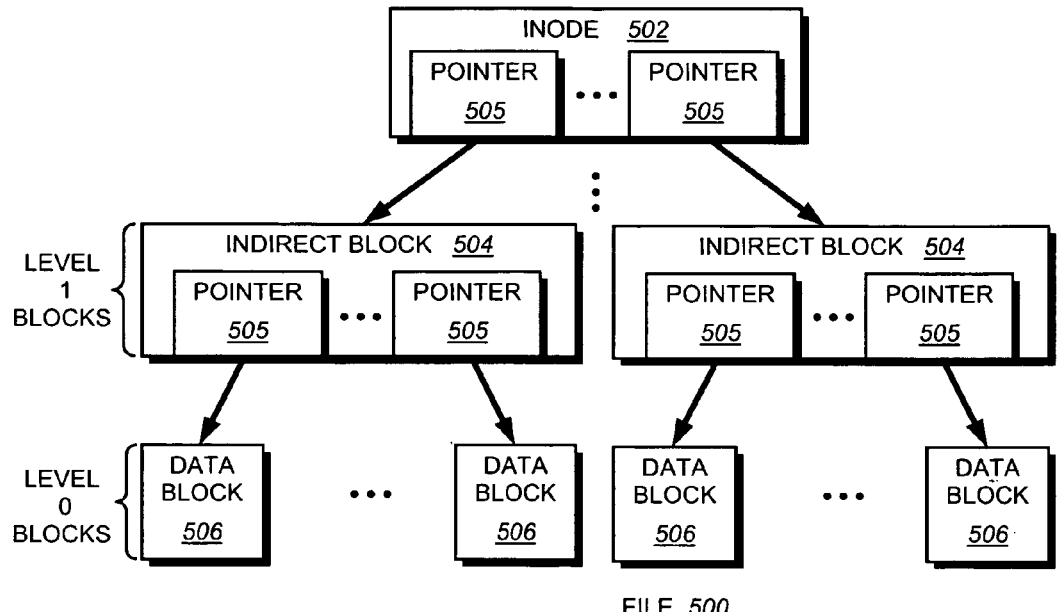
FIG. 5 is a schematic block diagram of an exemplary buffer tree in accordance with an embodiment of the present invention.

FIG. 5 is a schematic block diagram of an embodiment of a buffer tree of a file that may be advantageously used with the present invention. The buffer tree is an internal representation of blocks for a file (e.g., file 500) loaded into the memory 215 and maintained by the write-anywhere file system 336. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pointers 505 that ultimately reference data blocks 506 used to store the actual data of the file. That is, the data of file 500 are contained in data blocks and the locations of these blocks are stored in the indirect blocks of the file. Each level 1 indirect block 504 may contain pointers to as many as 1024 data blocks. According to the "write anywhere" nature of the file system, these blocks may be located anywhere on the disk shelves 112, 114.

A file system layout is provided that apportions an underlying physical volume into one or more virtual volumes (or flexible volume) of a storage system. An example of such a file system layout is described in U.S. patent application Ser. No. 10/836,817 titled EXTENSION OF WRITE ANY- WHERE FILE SYSTEM LAYOUT, by John K. Edwards, et al. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 500) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 6:
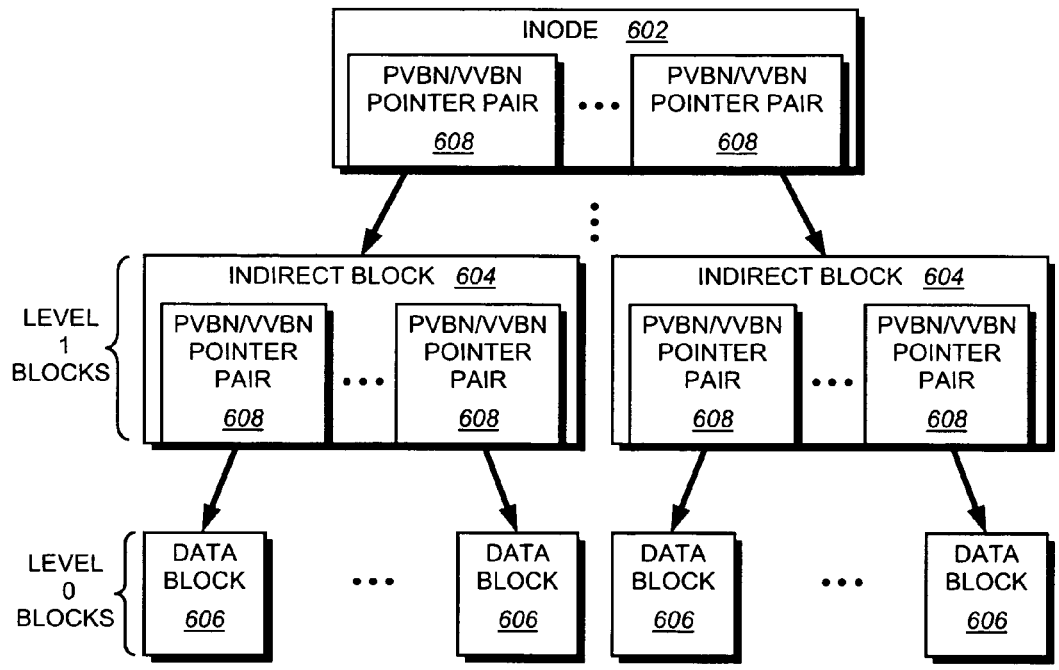
FIG. 6 is a schematic block diagram of an exemplary buffer tree illustrating pvbn/vvbn pointer pairs in accordance with an embodiment of the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 6 is a schematic block diagram of an illustrative embodiment of a buffer tree of a file 600 that may be advantageously used with the present invention. A root (top-level) inode 602, such as an embedded inode, references indirect (e.g., level 1) blocks 604. Note that there may be additional levels of indirect blocks (e.g., level 2, level 3) depending upon the size of the file. The indirect blocks (and inode) contain pvbn/vvbn pointer pair structures 608 that ultimately reference data blocks 606 used to store the actual data of the file.

The pvbns reference locations on disks of the aggregate, whereas the vvbns reference locations within files of the flexible volume. The use of pvbns as block pointers 608 in the indirect blocks 604 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 7:
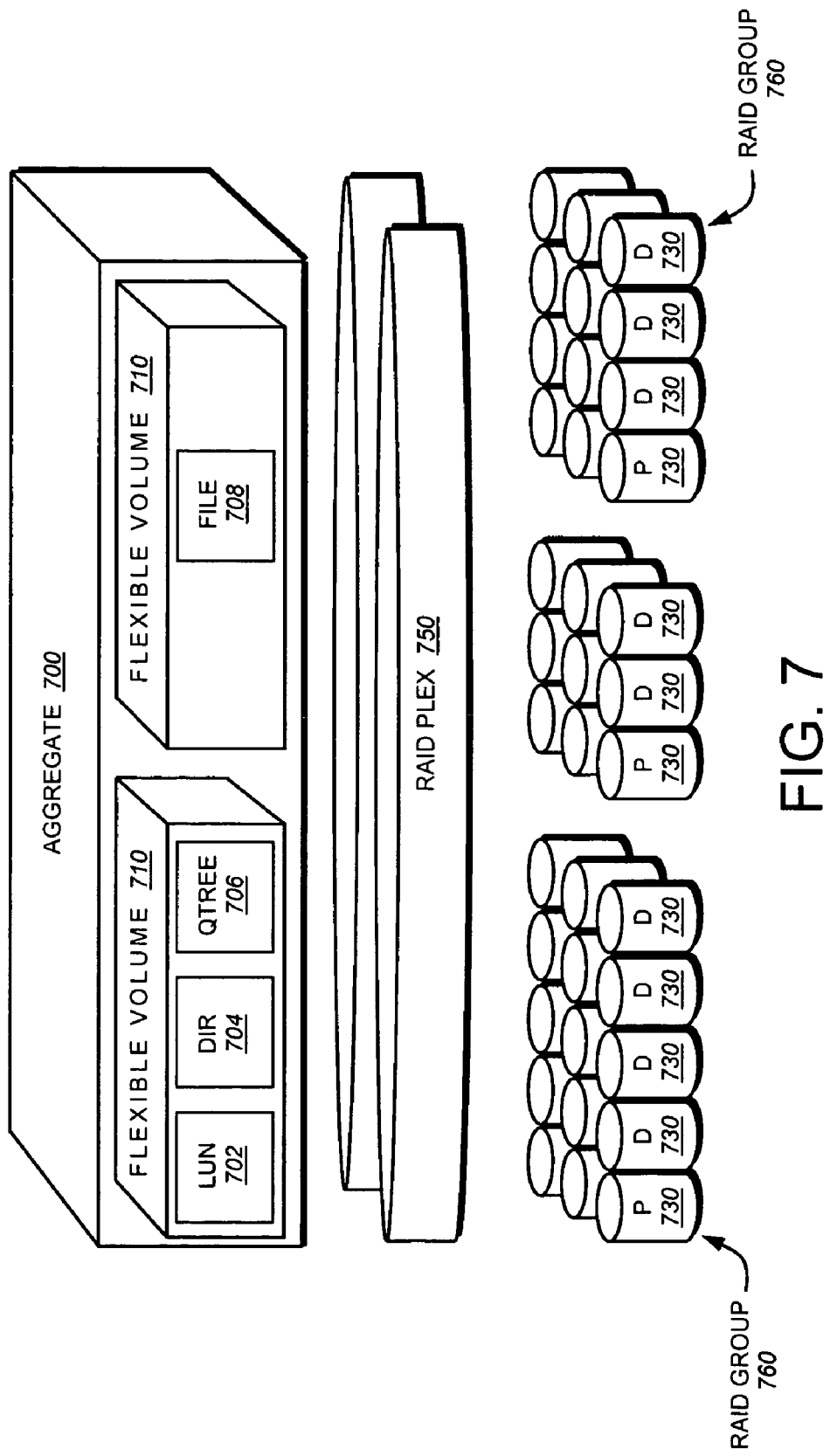
FIG. 7 is a schematic block diagram showing an aggregate in accordance with an embodiment of the present invention.

FIG. 7 is a schematic block diagram of an embodiment of an aggregate 700 that may be advantageously used with the present invention. Luns (blocks) 702, directories 704, qtrees 706 and files 708 may be contained within flexible volumes 710, such as dual vbn flexible volumes, that, in turn, are contained within the aggregate 700. The aggregate 700 is illustratively layered on top of the RAID system, which is represented by at least one RAID plex 750 (depending upon whether the storage configuration is mirrored), wherein each plex 750 comprises at least one RAID group 760. Each RAID group further comprises a plurality of disks 730, e.g., one or more data (D) disks and at least one (P) parity disk.

Whereas the aggregate 700 is analogous to a physical volume of a conventional storage system, a flexible volume is analogous to a file within that physical volume. That is, the aggregate 700 may include one or more files, wherein each file contains a flexible volume 710 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 710 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 8:
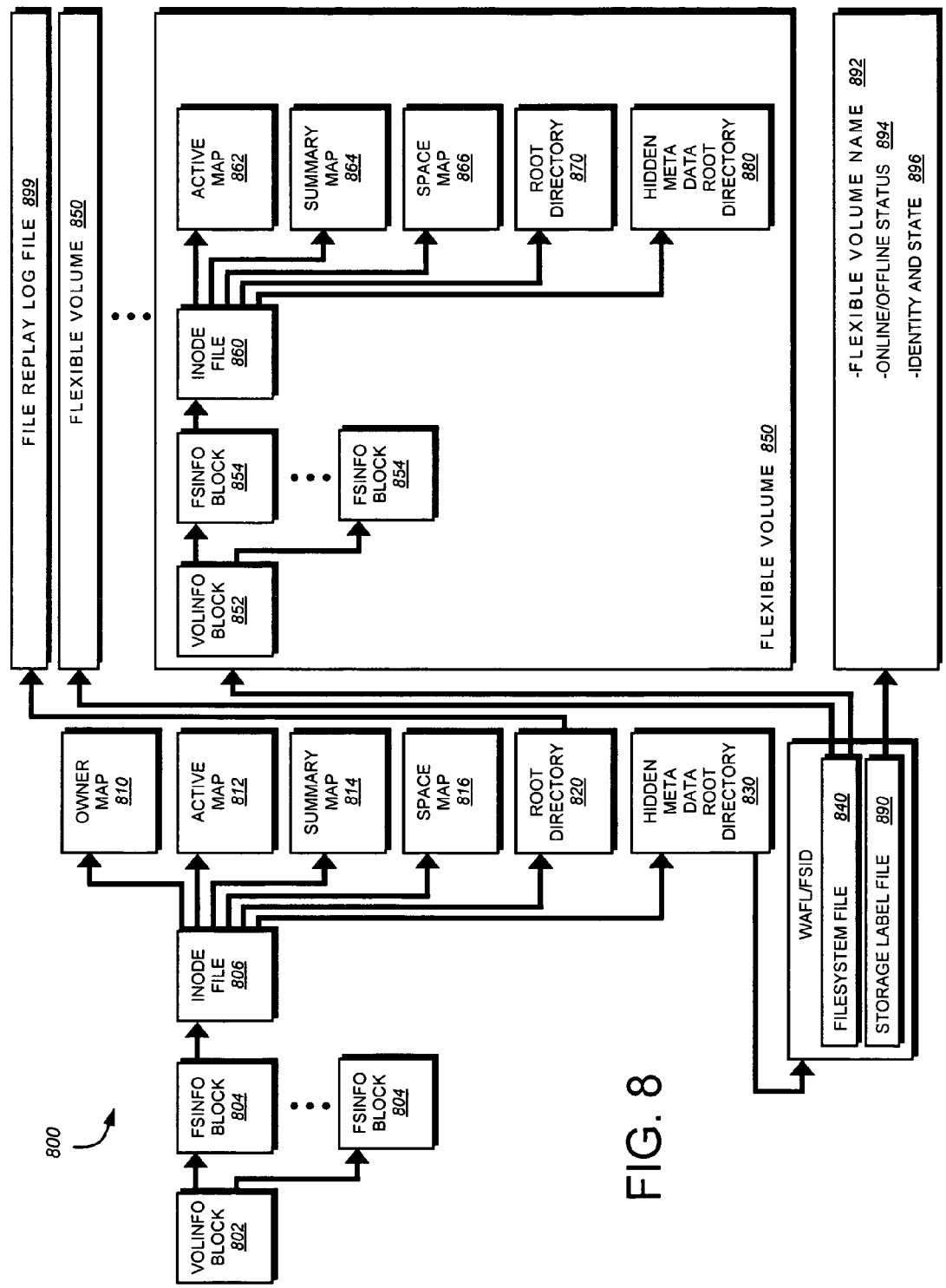
FIG. 8 is a schematic block diagram of an exemplary on-disk representation of a file system structure in accordance with an embodiment of the present invention.

FIG. 8 is a schematic block diagram of an on-disk representation of an aggregate 800. The storage operating system 300, e.g., the RAID system 340, assembles a physical volume of pvbns to create the aggregate 800, with pvbns 1 and 2 comprising a "physical" volinfo block 802 for the aggregate. The volinfo block 802 contains block pointers to fsinfo blocks 804, each of which may represent a snapshot of the aggregate. Each fsinfo block 804 includes a block pointer to an inode file 806 that contains inodes of a plurality of files, including an owner map 810, an active map 812, a summary map 814 and a space map 816, as well as other special meta-data files. The inode file 806 further includes a root directory 820 and a "hidden" meta-data root directory 830, the latter of which includes a namespace having files related to a flexible volume in which users cannot "see" the files. The hidden meta-data root directory includes the WAFL/fsid/ directory structure that contains filesystem file 840 and storage label file 890. Note that root directory 820 in the aggregate only contains a file replay log file 899. All other files related to the aggregate are organized within the hidden meta-data root directory 830. The file replay log file 899 is utilized in the present invention to store NVLog information of a partner storage system for later retrieval. It should be noted that in alternate embodiments, the file replay log file 899 may be located in other areas of the file system, or stored in other forms of persistent storage.

In addition to being embodied as a container file having level 1 blocks organized as a container map, the filesystem file 840 includes block pointers that reference various file systems embodied as flexible volumes 850. The aggregate 800 maintains these flexible volumes 850 at special reserved inode numbers. Each flexible volume 850 also has special reserved inode numbers within its flexible volume space that are used for, among other things, the block allocation bitmap structures. As noted, the block allocation bitmap structures, e.g., active map 862, summary map 864 and space map 866, are located in each flexible volume.

Specifically, each flexible volume 850 has the same inode file structure/content as the aggregate, with the exception that there is no owner map and no WAFL/fsid/filesystem file, storage label file directory structure in a hidden meta-data root directory 880. To that end, each flexible volume 850 has a volinfo block 852 that points to one or more fsinfo blocks 854, each of which may represent a snapshot, along with the active file system of the flexible volume. Each fsinfo block, in turn, points to an inode file 860 that, as noted, has the same inode structure/content as the aggregate with the exceptions noted above. Each flexible volume 850 has its own inode file 860 and distinct inode space with corresponding inode numbers, as well as its own root (fsid) directory 870 and subdirectories of files that can be exported separately from other flexible volumes.

The storage label file 890 contained within the hidden meta-data root directory 830 of the aggregate is a small file that functions as an analog to a conventional raid label. A raid label includes physical information about the storage system, such as the volume name; that information is loaded into the storage label file 890. Illustratively, the storage label file 890 includes the name 892 of the associated flexible volume 850, the online/offline status 894 of the flexible volume, and other identity and state information 896 of the associated flexible volume (whether it is in the process of being created or destroyed).

E. Storing and Retrieving File Replay Log Information

The present invention provides a system and method for storing and retrieving file system log information, such as NVLog information, in a clustered computer system. As used herein, a storage system cluster comprises a plurality of storage systems illustratively interconnected by a cluster interconnect device. Each storage system is further coupled to a plurality of storage devices, such as disks. In the event that a first storage system suffers an error condition, its partner storage system, (i.e., a second storage system) initiates a takeover operation of the disks and associated data containers serviced by the storage system. The second storage system replays the file system log information for the first storage system and begins servicing data access requests directed to data containers normally serviced by the first storage system. While servicing these data access requests, file system log information is accumulated in the second storage system's NVLog for later storage on disk.

In response to later suffering an error condition of its own, the second storage system stores file system log information associated with the disks of the first storage system in a file replay log within its root volume. Upon detecting its own error condition, the second storage system also performs a giveback operation to the first file system without replaying its file system log information to disk. Upon re-initialization of both storage systems, the first storage system may request, via the cluster interconnect, the contents of the file replay log from the second storage system. The second storage system transmits the log information from the file replay log to the first storage system via the cluster interconnect, which then utilizes the file replay log information to ensure that its disks are in a consistent state. The first storage system may then resume data access operations without loss of data and/or significant periods of data unavailability.

Figure 9:
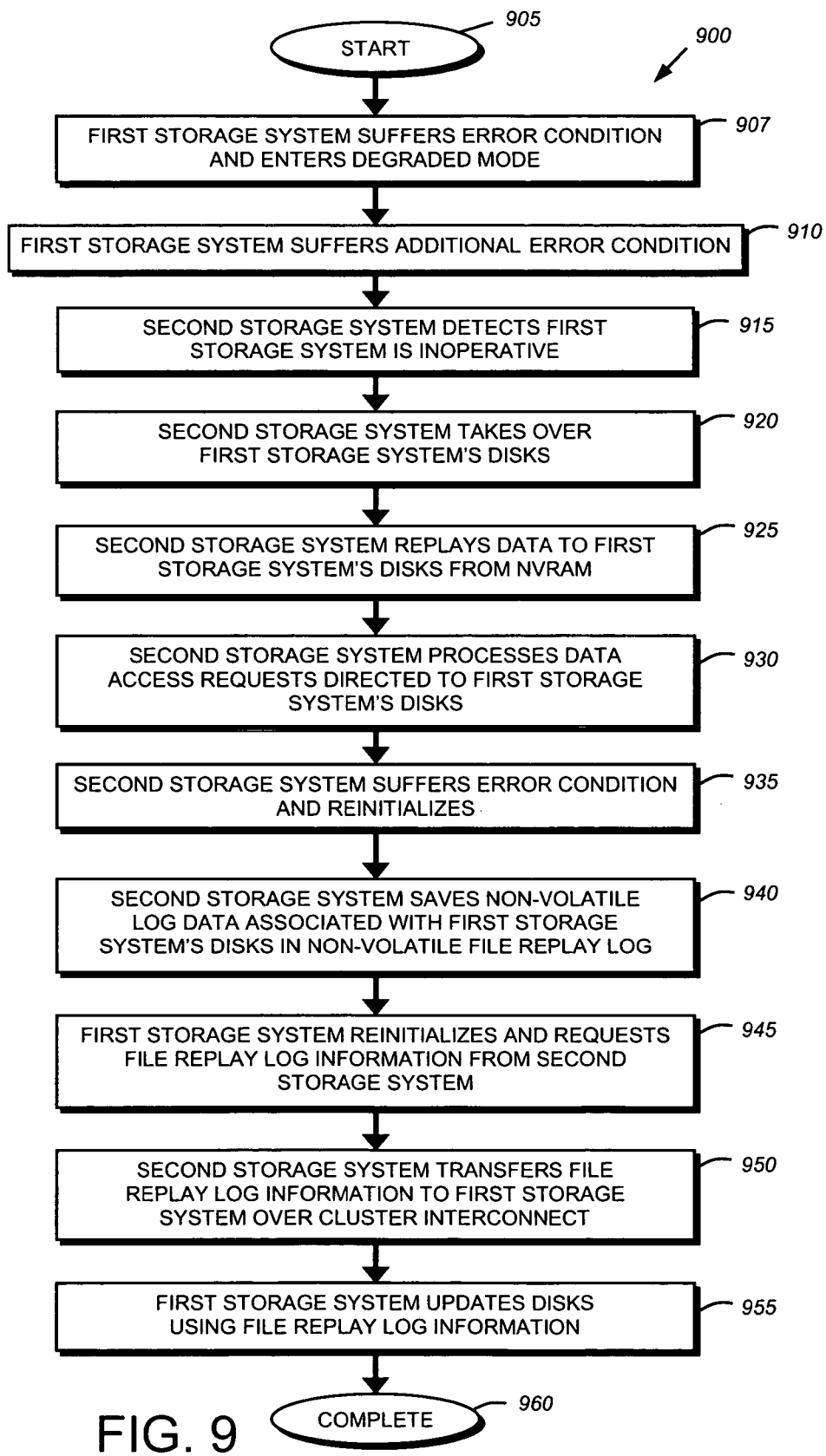
FIG. 9 is a flowchart detailing the steps of a procedure for storing and retrieving file system log information in accordance with an embodiment of the present invention.

FIG. 9 is a flowchart detailing the steps of a procedure 900 for storing and retrieving file replay log information, such as NVLog information, in accordance with an embodiment of the present invention. The procedure 900 begins in step 905 and continues to step 907 where the first storage system suffers a first error condition and enters a degraded mode. This may be due to, e.g., the failure of a disk from an array, etc. Then, in step 910, the first storage system suffers a second additional error condition that causes system unavailability or other severe failure. This second error condition may be the result of, e.g., software errors, such as the loss of power, network connectivity errors, etc. Upon the first storage system suffering the second error condition, a second storage system, in step 915, detects that the first storage system is inoperative. Typically, this detection may occur by a loss of a heartbeat signal from the first storage system. However, in alternate embodiments, any technique for monitoring the status of the cluster partner may be utilized.

In response to the second storage system detecting the inoperativeness of the first storage system, the second storage system, in step 920, takes over the first storage system's storage devices, such as disks. Such a takeover operation may be performed using any known takeover operation, e.g., the takeover described in U.S. Pat. No. 6,920,579, entitled OPERATOR INITIATED GRACEFUL TAKEOVER IN A NODE CLUSTER, by Samuel M. Cramer et al. Once the second storage system has taken over the first storage systems disks, it replays the data stored in its NVRAM NVLog to the first storage system's disks in step 925. Each storage system contains a mirrored copy of its partner's NVRAM to enable logging logs of data access operations directed to the disks of both the storage system and its partner. By replaying the NVLog, the second storage system causes the first storage system's disks to become consistent. At this point the second storage system may begin processing data access requests directed to the first storage system's disks in step 930. In step 935, the second storage system then suffers an error condition and begins re-initializing. During the re-initialization process, the second storage system saves the NVLog (file replay log information) associated with the first storage system's disks to file replay log file 899, in step 940. As noted above, the file replay log file 899 is illustratively stored within root volume of the second storage system. However, it should be noted that in alternate embodiments, the file replay log file 899 may be stored in other locations.

In step 945, the first storage system re-initializes and requests the file replay log information from the second storage system. Illustratively, this request is sent via the cluster interconnect 110 from the first storage system to the second storage system. However, in alternate embodiments, the storage systems may communicate using other networking techniques including, for example, communicating over network 102, etc. In step 950, the second storage system then transfers the file replay log information to the first storage system over the cluster interconnect. Upon receiving the file replay log information, the first storage system updates its disks using that information in step 955. Such updating may be performed by replaying the information to store it on the disks. Once they have been updated, the first storage system's disks are consistent and the first storage system may begin to process data access requests without requiring a full file system check. The procedure 900 then completes in step 960.

The foregoing description has been directed to specific embodiments of this invention. It will be apparent, however, that other variations and modifications may be made to the described embodiments, with the attainment of some or all of their advantages. The procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for storing and retrieving file system log information in a clustered computer system, the method comprising the steps of:
   providing a first storage system and a second storage system connected by a cluster interconnect and each of said first storage system and said second storage system having a direct connection to the other system's storage devices, and each of said first storage system and said second storage system containing a mirrored copy of the other storage system's file system log information to enable logging of data access operations directed to the disks of both storage systems, and continuously maintaining, at each storage system, ongoing file system log information of its own and for the other storage system such that each storage system is in a ready state to take over in case of failure of the other storage system;
   performing a takeover operation, at a second storage system, of one or more storage devices associated with a first storage system, through said direct connection to said first storage system's storage devices including handling data access requests and storing file system log information directed to the first storage system;
   thereafter, continuing to store ongoing file system log information on one or more data storage devices associated with the second storage system;
   upon the first storage system re-initializing, transferring the file system log information of the first storage system from the second storage system to the first storage system across a cluster interconnect; and
   updating the one or more storage devices associated with the first storage system using the file system log information.

2. The method of claim 1 wherein the data storage devices associated with the first storage system comprise disks.

3. The method of claim 1 wherein the storage devices associated with the second storage system comprise disks.

4. The method of claim 1 wherein the file system log information is stored in a file replay log residing in the each storage system.

5. The method of claim 4 wherein the file replay log is stored in a root volume associated with the each storage system.

6. The method of claim 1 wherein the file system log information is stored in a nonvolatile persistent memory within each storage system.

7. The method of claim 1 wherein the takeover operation comprises the step of replaying a set of data from a persistent memory to the storage devices associated with the first storage system.

8. A system for storing and retrieving file system log information in a clustered storage system, the system comprising:
   a first storage system operatively interconnected with a second storage system by a cluster interconnect to form the clustered storage system;
   one or more storage devices associated with the first storage system;
   one or more storage devices associated with the second storage system;
   each of said first storage system and said second storage system having a direct connection to one or more of the storage devices of the other storage system, and each of said first storage system and said second storage system continuously maintaining ongoing file system log information of its own and of the other storage system so that each storage system maintains a mirrored copy of the other storage system's file system log information to enable logging of data access operations directed to the disks of both storage systems such that each storage system is in a ready state to take over in case of failure of the other storage system; and
   a storage operating system executing on the second storage system, the storage operating system adapted, in response to detecting an error condition on the first storage system in the cluster, to perform a takeover operation and further adapted to continue to store the file system log information associated with the first storage system, on the second storage system; and
   in response to detecting a second error condition on the second storage system, the second storage system performing a giveback operation, and upon re-initialization of both storage systems, the first storage system requests, via a cluster interconnect, the contents of its file replay log file from the second storage system.

9. The system of claim 8 further comprising a storage operating system executing on the first storage system adapted to, in response to re-initialization after the second error condition, update the storage devices associated with the first storage system using file system log information that has been transferred to the first storage system by the second storage system over a cluster interconnect.

10. The system of claim 8 wherein the one or more storage devices associated with the first storage system comprise disks and wherein the one or more storage devices associated with the second storage system comprise disks.

11. The system of claim 8 wherein the file system log information is stored in a file replay log file associated with each storage system.

12. The method of claim 8 wherein the file system log information is stored in a nonvolatile persistent memory within one or both of the first and the second storage system.

13. A computer readable medium, including program instructions executing on a computer, for storing and retrieving file system log information, the computer readable medium including program instructions for performing the steps of:
   storing a set of file system log information of a first storage system on a second storage system, and the second storage system continuously maintaining ongoing file system log information of the first storage system and said second storage system maintains a mirrored copy of the first storage system's file system log information, such that the second storage system is in a ready state to take over in case of failure of the first storage system;
   performing, by the second storage system, a takeover operation of one or more storage devices associated with the first storage system including handling data access requests by a connection between the second storage system and one or more storage devices of the first storage system, and using file system log information directed to the first storage system;
   upon said first storage system re-initializing, requesting, by the first storage system, the file system log information from the second storage system;

upon said forst storage system re-initializing, requesting, by the first storage system, the file system log information from the second storage system;

transferring by the second storage system to the first storage system, the file system log information, across a cluster interconnect; and updating, by the first storage system, the one or more storage devices associated with the first storage system using the file system log information.

14. A method for storing and retrieving file system log information by a first storage system from a second storage system, the method comprising the steps of:

storing the file system log information of the first storage system on one or more data storage devices associated with the second storage system;

storing the file system log information of the second storage system on one or more data storage devices associated with the first storage system;

continuously maintaining, at said first storage system ongoing file system log information of each storage system so that said first storage system continuously maintains ongoing file system log information of its own and the file system log information of the second storage system so that said first storage system stores a mirrored copy of the second storage system's file system log information such that said first storage system is in a ready state to take over in case of failure of the second storage system;

performing, by the first storage system, a takeover operation of one or more storage devices associated with the second storage system including handling data access requests and storing file system log information directed to the second storage system;

upon the second storage system re-initializing, requesting the file system log information from the first storage system by the second storage system; and transferring the file system log information from the first storage system to the second storage system across a cluster interconnect for updating, by said first storage system, the one or more storage devices associated with the first storage system using the file system log information.

15. The method of claim 14 wherein the data storage devices associated with the first storage system comprise disks.

16. The method of claim 14 wherein the storage devices associated with the second storage system comprise disks.

17. The method of claim 14 wherein the file system log information is stored in a file replay log.

18. The method of claim 17 wherein the file replay log is stored in a volume associated with the second storage system.

19. The method of claim 14 wherein the file system log information is stored in a nonvolatile persistent memory within the second storage system.

20. The method of claim 14 further comprising the step of replaying a set of data from a persistent memory to the storage devices associated with the first storage system.

21. The method of claim 14 wherein the file system log information comprises of one or more recorded data access requests.

22. The method for storing and retrieving file system log information in a clustered computer system as defined in claim 1 further comprising:

storing a mirrored copy of the file system log information for each storage system on one or more data storage devices associated with the other storage system in the cluster.

* * * * *